United States Patent
Li et al.

(10) Patent No.: US 10,540,751 B2
(45) Date of Patent: Jan. 21, 2020

(54) IMAGE DATA TRANSMISSION METHOD, IMAGE DATA PROCESSING METHOD, IMAGE PROCESSING DEVICE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yafei Li, Beijing (CN); Bo Gao, Beijing (CN); Wei Sun, Beijing (CN); Hao Zhang, Beijing (CN); Ming Chen, Beijing (CN); Lingyun Shi, Beijing (CN); Guangquan Wang, Beijing (CN); Xiurong Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 19 days.

(21) Appl. No.: 15/928,574

(22) Filed: Mar. 22, 2018

(65) Prior Publication Data
US 2019/0147566 A1 May 16, 2019

(30) Foreign Application Priority Data
Nov. 13, 2017 (CN) .......................... 2017 1 1113800

(51) Int. Cl.
*G06T 3/40* (2006.01)
*G09G 5/391* (2006.01)

(52) U.S. Cl.
CPC .......... *G06T 3/4092* (2013.01); *G06T 3/4038* (2013.01); *G09G 5/391* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2009/0158222 A1* | 6/2009 | Kerr | ........................ G06F 3/016 715/867 |
| 2015/0023407 A1 | 1/2015 | Sato | |

(Continued)

FOREIGN PATENT DOCUMENTS

| CN | 104170384 A | 11/2014 |
|---|---|---|
| CN | 107040794 A | 8/2017 |

(Continued)

OTHER PUBLICATIONS

Backpack, http://pngimg.com/download/6320, all pages, from 2014.*

(Continued)

*Primary Examiner* — Frank S Chen
(74) *Attorney, Agent, or Firm* — Brooks Kushman P.C.

(57) ABSTRACT

The image data transmission method provided by embodiments of the present disclosure is used in the image processing device, and includes steps of: acquiring a fixation region and a non-fixation region on a display screen of the display device; compressing image data of a to-be-displayed image corresponding to the non-fixation region to acquire image data at a second resolution; and combining the image data at the second resolution with image data of the to-be-displayed image at a first resolution corresponding to the fixation region, and outputting the combined image data to (Continued)

the display device, the first resolution being substantially greater than the second resolution.

16 Claims, 4 Drawing Sheets

(56) References Cited

U.S. PATENT DOCUMENTS

2018/0075582 A1\* 3/2018 Chen .......................... G06T 9/00
2019/0025685 A1\* 1/2019 Chung ................. H04N 9/3188

FOREIGN PATENT DOCUMENTS

| CN | 107122152 A | 9/2017 |
| JP | 2010258724 A | 11/2010 |
| JP | 2014007441 A | 1/2014 |

OTHER PUBLICATIONS

Mandatory, https://www.mandatory.com/living/1007197-oculus-rift-vs-htc-vive-vs-playstation-vr-buy, all pages, from 2016.\*
First Office Action for Chinese Application No. 201711113800.4, dated May 21, 2019, 7 Pages.

\* cited by examiner

IMAGE DATA TRANSMISSION METHOD, IMAGE DATA PROCESSING METHOD, IMAGE PROCESSING DEVICE AND DISPLAY DEVICE

CROSS-REFERENCE TO RELATED APPLICATION

The present application claims priority to Chinese Patent Application No. 201711113800.4 filed on Nov. 13, 2017, which is incorporated herein by reference in its entirety.

TECHNICAL FIELD

The present disclosure relates to the field of display technology, in particular to an image data transmission method, an image data processing method, an image processing device, and a display device.

BACKGROUND

Currently, for a display product, a resolution and a refresh rate are highly demanded, and data transmission between an image processing (AP) device for storing therein source image data and a driving Integrated Circuit (IC) of a display device may be greatly limited. Insufficient data bandwidth may result in a tearing phenomenon, and thereby a display effect may be adversely affected. One conventional scheme is to compress the image data at an AP end, transmit the compressed image data to the driving IC of the display device, decompress the image data through the driving IC, and then output and display the decompressed image data. Another conventional scheme is to transmit low-resolution image data from the AP to the display device, scale up the low-resolution image through the driving IC of the display device, and then output and display the resultant image data. However, through the above two schemes, a high-fidelity display effect may be adversely affected to some extent.

SUMMARY

In one aspect, the present disclosure provides in some embodiments an image data transmission method for an image processing device capable of being in communication with a display device, including steps of: acquiring a fixation region and a non-fixation region on a display screen of the display device; compressing image data of a to-be-displayed image corresponding to the non-fixation region to acquire image data at a second resolution; and combining the image data at the second resolution with image data of the to-be-displayed image at a first resolution corresponding to the fixation region, and outputting the combined image data to the display device, the first resolution being substantially greater than the second resolution.

In a possible embodiment of the present disclosure, the step of acquiring the fixation region and the non-fixation region on the display screen of the display device includes receiving information about the fixation region and the non-fixation region from the display device.

In a possible embodiment of the present disclosure, the step of combining the image data at the second resolution with the image data of the to-be-displayed image at the first resolution corresponding to the fixation region and outputting the combined image data to the display device includes, in the case that the second resolution is $x*y$, the first resolution is $X*Y$ and $X>x$, combining the image data at the second resolution with the image data at the first resolution so as to acquire image data at a resolution of $X*(Y+y)$. In the combined image data at the resolution of $X*(Y+y)$, image data in a first row to a $Y^{th}$ row is the image data at the first resolution, image data in previous x columns of image data in a $(Y+1)^{th}$ row to a $(Y+y)^{th}$ row is the image data at the second resolution, and image data in an $(x+1)^{th}$ column to an $X^{th}$ column of the image data in the $(Y+1)^{th}$ row to the $(Y+y)^{th}$ row is invalid image data; or the image data in the first row to the $Y^{th}$ row is the image data at the first resolution, image data in last x columns of the image data in the $(Y+1)^{th}$ row to the $(Y+y)^{th}$ row is the image data at the second resolution, and image data in a first column to an $(X-x)^{th}$ column of the image data in the $(Y+1)^{th}$ row to the $(Y+y)^{th}$ row is invalid image data.

In a possible embodiment of the present disclosure, high-definition image data corresponding to the fixation region has the first resolution of 1440*1600, and low-definition image data corresponding to the non-fixation region has the second resolution of 1080*1200.

In a possible embodiment of the present disclosure, in the case of combining the high-definition image data with the low-definition image data, invalid image data having a resolution of 360*1200 is compensated on the right of the low-definition image data.

In another aspect, the present disclosure provides in some embodiments an image data processing method for use in a display device capable of being in communication with an image processing device, including steps of: receiving image data of a to-be-displayed image from the image processing device, and acquiring image data at a first resolution corresponding to a fixation region and image data at a second resolution corresponding to a non-fixation region in accordance with the image data of the to-be-displayed image, the first resolution being substantially greater than the second resolution; and scaling up the image data at the second resolution, stitching the resultant image data at the second resolution with the image data at the first resolution, and outputting and displaying the stitched image data.

In a possible embodiment of the present disclosure, prior to the step of receiving the image data of the to-be-displayed image from the image processing device, the method further includes: determining the fixation region and the non-fixation region on a display screen of the display device; and transmitting information about the fixation region and the non-fixation region to the image processing device.

In a possible embodiment of the present disclosure, the step of acquiring the image data at the first resolution corresponding to the fixation region and the image data at the second resolution corresponding to the non-fixation region in accordance with the image data of the to-be-displayed image includes: in the case that the second resolution is $x*y$, the first resolution is $X*Y$ and $X>x$, extracting image data in a first row to a $Y^{th}$ row as the image data at the first resolution from image data at a resolution of $X*(Y+y)$ of the received to-be-displayed image, and extracting image data in previous x columns of image data in a $(Y+1)^{th}$ row to a $(Y+y)^{th}$ row as the image data at the second resolution; or extracting the image data in the first row to the $Y^{th}$ row as the image data at the first resolution from the image data at the resolution of $X*(Y+y)$ of the received to-be-displayed image, and extracting image data in last x columns of the image data in the $(Y+1)^{th}$ row to the $(Y+y)^{th}$ row as the image data at the second resolution.

In a possible embodiment of the present disclosure, high-definition image data corresponding to the fixation region has the first resolution of 1440*1600, and low-definition image data corresponding to the non-fixation region has the second resolution of 1080*1200.

In a possible embodiment of the present disclosure, after the combined image data has been transmitted to the display device, the method further includes discarding, by a driving IC of the display device, invalid image data, scaling up the image data at the second resolution, stitching the resultant image data at the second resolution with the image data at the first resolution while outputting the resultant image data at the second resolution, and outputting and displaying the stitched image data.

In yet another aspect, the present disclosure provides in some embodiments an image data transmission device for use in an image processing device capable of being in communication with a display device, including: an acquisition circuit configured to acquire a fixation region and a non-fixation region on a display screen of the display device; a compression circuit configured to compress image data of a to-be-displayed image corresponding to the non-fixation region to acquire image data at a second resolution; and a transmission circuit configured to combine the image data at the second resolution with image data of the to-be-displayed image at a first resolution corresponding to the fixation region, and output the combined image data to the display device, the first resolution being substantially greater than the second resolution.

In a possible embodiment of the present disclosure, the acquisition circuit is further configured to receive information about the fixation region and the non-fixation region from the display device.

In a possible embodiment of the present disclosure, the transmission circuit is further configured to, in the case that the second resolution is x*y, the first resolution is X*Y and X>x, combine the image data at the second resolution with the image data at the first resolution so as to acquire image data at a resolution of X*(Y+y). In the combined image data at the resolution of X*(Y+y), image data in a first row to a $Y^{th}$ row is the image data at the first resolution, image data in previous x columns of image data in a $(Y+1)^{th}$ row to a $(Y+y)^{th}$ row is the image data at the second resolution, and image data in an $(x+1)^{th}$ column to an $X^{th}$ column of the image data in the $(Y+1)^{th}$ row to the $(Y+y)^{th}$ row is invalid image data; or the image data in the first row to the $Y^{th}$ row is the image data at the first resolution, image data in last x columns of the image data in the $(Y+1)^{th}$ row to the $(Y+y)^{th}$ row is the image data at the second resolution, and image data in a first column to an $(X-x)^{th}$ column of the image data in the $(Y+1)^{th}$ row to the $(Y+y)^{th}$ row is invalid image data.

In still yet another aspect, the present disclosure provides in some embodiments an image data processing device for use in a display device capable of being in communication with an image processing device, including: a reception circuit configured to receive image data of a to-be-displayed image from the image processing device, and acquire image data at a first resolution corresponding to a fixation region and image data at a second resolution corresponding to a non-fixation region in accordance with the image data of the to-be-displayed image, the first resolution being substantially greater than the second resolution; and a processing circuit configured to scale up the image data at the second resolution, stitch the resultant image data at the second resolution with the image data at the first resolution, and output and display the stitched image data.

In a possible embodiment of the present disclosure, the image data processing device further includes: a user tracking circuit configured to determine the fixation region and the non-fixation region on a display screen of the display device; and a transmission circuit configured to transmit information about the fixation region and the non-fixation region to the image processing device.

In a possible embodiment of the present disclosure, the reception circuit is further configured to: in the case that the second resolution is x*y, the first resolution is X*Y and X>x, extract image data in a first row to a $Y^{th}$ row as the image data at the first resolution from image data at a resolution of X*(Y+y) of the received to-be-displayed image, and extract image data in previous x columns of image data in a $(Y+1)^{th}$ row to a $(Y+y)^{th}$ row as the image data at the second resolution; or extract the image data in the first row to the $Y^{th}$ row as the image data at the first resolution from the image data at the resolution of X*(Y+y) of the received to-be-displayed image, and extract image data in last x columns of the image data in the $(Y+1)^{th}$ row to the $(Y+y)^{th}$ row as the image data at the second resolution.

In still yet another aspect, the present disclosure provides in some embodiments an image data processing device, including a memory, a processor and a computer program stored in the memory and capable of being executed by the processor. The processor is configured to execute the computer program so as to implement the above-mentioned image data transmission method.

In still yet another aspect, the present disclosure provides in some embodiments a display device, including a memory, a processor and a computer program stored in the memory and capable of being executed by the processor. The processor is configured to execute the computer program so as to implement the above-mentioned image data processing method.

In still yet another aspect, the present disclosure provides in some embodiments a non-transistory computer-readable storage medium storing therein a computer program. The computer program is executed by a processor, so as to implement steps of the above-mentioned image data transmission method.

In still yet another aspect, the present disclosure, the present disclosure provides in some embodiments a non-transistory computer-readable storage medium storing therein a computer program. The computer program is executed by a processor, so as to implement steps of the above-mentioned image data processing method.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

In order to make the objects, the technical solutions and the advantages of the present disclosure more apparent, the present disclosure will be described hereinafter in a clear and complete manner in conjunction with the drawings and embodiments.

Currently, for a display product, a resolution and a refresh rate are highly demanded, and data transmission between an image processing device for storing therein source image data and a driving IC of a display device may be greatly limited. Insufficient data bandwidth may result in a tearing phenomenon, and thereby a display effect may be adversely affected. One conventional scheme is to compress the image data at an image processing device end, transmit the compressed image data to the driving IC of the display device, decompress the image data through the driving IC, and then output and display the decompressed image data. Another conventional scheme is to transmit low-resolution image data from the image processing device to the display device, scale up the low-resolution image through the driving IC of the display device, and then output and display the resultant image data. However, through the above two schemes, a high-fidelity display effect may be adversely affected to some extent.

During the formation of an image through eyes, a part of the image acquired in a central concave viewing field has a high resolution and a viewer has high visual acuity, while a part of the image acquired in a peripheral viewing field is relatively blurry. Hence, during an image rendering procedure, it is merely necessary to render the part of the image acquired in the central concave viewing field, and render, in a blurry manner, the part of the image acquired in the peripheral viewing field. Due to the rotation of eyeballs of the viewer, a high-definition, to-be-rendered region may change along with a viewing point. An object of the present disclosure is to provide an image data transmission method, an image data processing method, an image processing device and a display device, so as to transmit high-resolution image data corresponding to a fixation region and low-resolution image data corresponding to a non-fixation region between the image processing device and the display device, thereby to effectively reduce the data transmission volume while ensuring the high-resolution image displayed at the fixation region, and reduce the power consumption.

Figure 1:
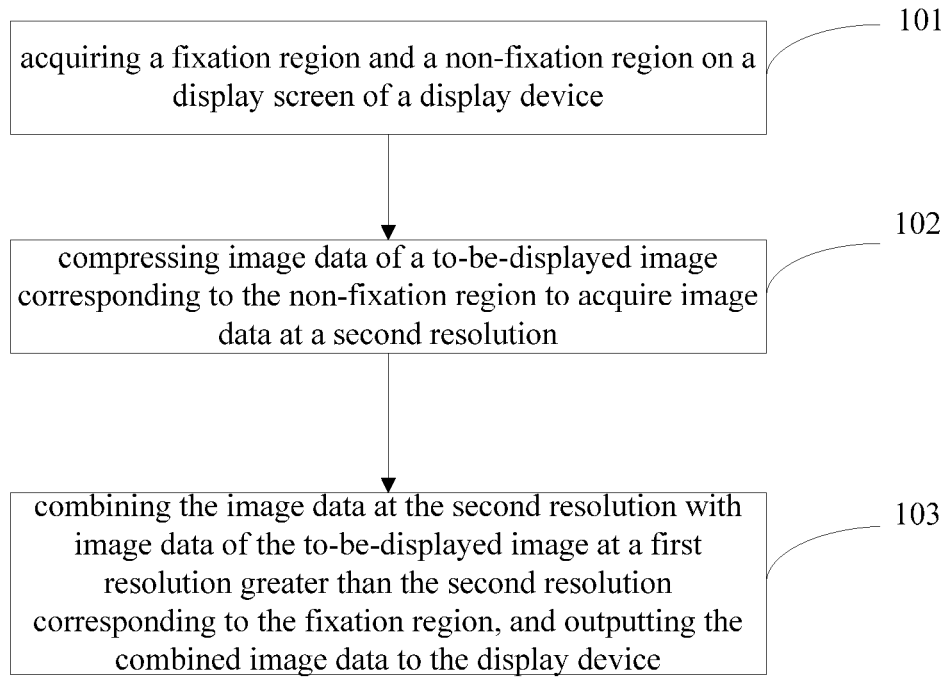
FIG. 1 is a flow chart of an image data transmission method according to one embodiment of the present disclosure.

The present disclosure provides in some embodiments an image data transmission method for use in an image processing device capable of being in communication with a display device. As shown in FIG. 1, the image data transmission method includes: Step 101 of acquiring a fixation region and a non-fixation region on a display screen of the display device; Step 102 of compressing image data of a to-be-displayed image corresponding to the non-fixation region to acquire image data at a second resolution; and Step 103 of combining the image data at the second resolution with image data of the to-be-displayed image at a first resolution corresponding to the fixation region, and outputting the combined image data to the display device, the first resolution being substantially greater than the second resolution.

According to the image data transmission method in the embodiments of the present disclosure, the fixation region and the non-fixation region on the display screen of the display device are acquired at first, then the image data of the to-be-displayed image corresponding to the non-fixation region is compressed so as to acquire low-definition image data, and then high-definition image data corresponding to the fixation region and the low-definition image data corresponding to the non-fixation region are combined together and transmitted to the display device. As a result, it is able to compress and transmit the image data corresponding to the non-fixation region while ensure the transmission of the original, high-definition image data corresponding to the fixation region, thereby to effectively reduce the data volume transmitted between the image processing device and the display device, and reduce the power consumption.

To be specific, the display device may determine the fixation region and the non-fixation region on the display screen using an eyeball tracking technique, and transmit information about the fixation region and the non-fixation region to the image processing device.

For example, the step of acquiring the fixation region and the non-fixation region on the display screen of the display device may include receiving the information about the fixation region and the non-fixation region from the display device.

Further, the step of combining the image data at the second resolution with the image data of the to-be-displayed image at the first resolution corresponding to the fixation region and outputting the combined image data to the display device includes, in the case that the second resolution is x*y, the first resolution is X*Y and X>x, combining the image data at the second resolution with the image data at the first resolution so as to acquire image data at a resolution of X*(Y+y). In the combined image data at the resolution of X*(Y+y), image data in a first row to a $Y^{th}$ row is the image data at the first resolution, image data in previous x columns of image data in a $(Y+1)^{th}$ row to a $(Y+y)^{th}$ row is the image data at the second resolution, and image data in an $(x+1)^{th}$ column to an $X^{th}$ column of the image data in the $(Y+1)^{th}$ row to the $(Y+y)^{th}$ row is invalid image data; or the image data in the first row to the $Y^{th}$ row is the image data at the first resolution, image data in last x columns of the image data in the $(Y+1)^{th}$ row to the $(Y+y)^{th}$ row is the image data at the second resolution, and image data in a first column to an $(X-x)^{th}$ column of the image data in the $(Y+1)^{th}$ row to the $(Y+y)^{th}$ row is invalid image data.

In the case that the high-definition image data corresponding to the fixation region is combined with the low-definition image data corresponding to the non-fixation region, the high-definition image data corresponding to the fixation region has a resolution different from the low-definition image data corresponding to the non-fixation region. In order to provide an identical scaling ratio in both an X-axis direction and a Y-axis direction in the case of displaying the image, in the combined image data at the resolution of X*(Y+y), the image data in the first row to the $Y^{th}$ row may be the image data at the first resolution, the image data in previous x columns of the image data in the $(Y+1)^{th}$ row to the $(Y+y)^{th}$ row may be the image data at the second resolution, and the image data in the $(x+1)^{th}$ column to the $X^{th}$ column of the image data in the $(Y+1)^{th}$ row to the $(Y+y)^{th}$ row may be invalid image data; or the image data in the first row to the $Y^{th}$ row may be the image data at the first resolution, the image data in last x columns of the image data in the $(Y+1)^{th}$ row to the $(Y+y)^{th}$ row may be the image data at the second resolution, and the image data in the first column to the $(X-x)^{th}$ column of the image data in the $(Y+1)^{th}$ row to the $(Y+y)^{th}$ row may be invalid image data. In this way, it is able to effectively reduce the difficulty in scaling up the image data in the case that the low-definition image data is scaled up at different scaling ratios in horizontal and longitudinal directions.

Figure 2:
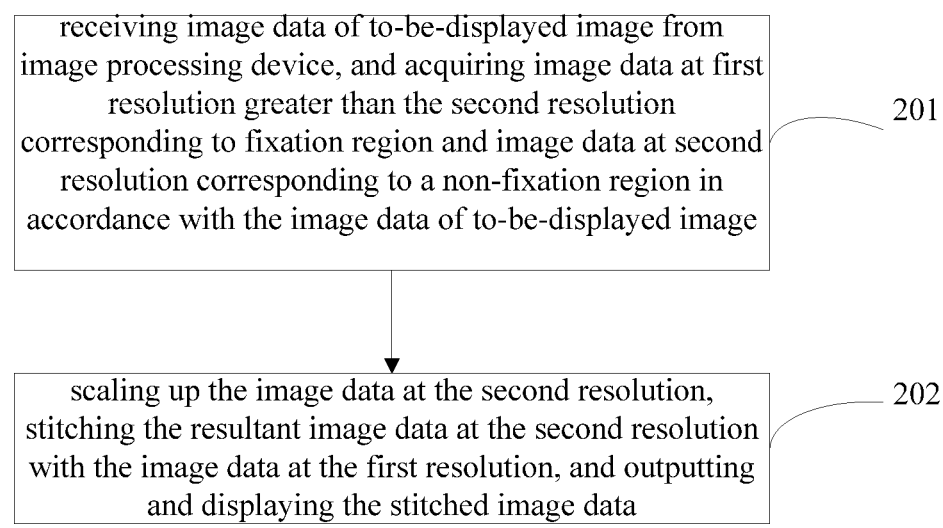
FIG. 2 is a flow chart of an image data processing method according to one embodiment of the present disclosure.

The present disclosure further provides in some embodiments an image data processing method for use in a display device capable of being in communication with an image processing device. As shown in FIG. 2, the image data processing method includes: Step 201 of receiving image data of a to-be-displayed image from the image processing device, and acquiring image data at a first resolution corresponding to a fixation region and image data at a second resolution corresponding to a non-fixation region in accordance with the image data of the to-be-displayed image, the first resolution being substantially greater than the second resolution; and Step 202 of scaling up the image data at the second resolution, stitching the resultant image data at the second resolution with the image data at the first resolution, and outputting and displaying the stitched image data.

According to the image data processing method in the embodiments of the present disclosure, the image data received by the display device includes the low-definition image data corresponding to the non-fixation region and the high-definition image data corresponding to the fixation region. The low-definition image data is acquired through compressing the image data of the to-be-displayed image corresponding to the non-fixation region. As a result, it is able to compress and transmit the image data corresponding to the non-fixation region while ensuring the transmission of the original, high-definition image data corresponding to the fixation region, thereby to effectively reduce the data volume transmitted between the image processing device and the display device, and reduce the power consumption.

Further, prior to the step of receiving the image data of the to-be-displayed image from the image processing device, the method further includes: determining the fixation region and the non-fixation region on a display screen of the display device; and transmitting information about the fixation region and the non-fixation region to the image processing device.

To be specific, the display device may determine the fixation region and the non-fixation region on the display screen using an eyeball tracking technique, and transmit information about the fixation region and the non-fixation region to the image processing device.

Further, the step of acquiring the image data at the first resolution corresponding to the fixation region and the image data at the second resolution corresponding to the non-fixation region in accordance with the image data of the to-be-displayed image includes: in the case that the second resolution is $x*y$, the first resolution is $X*Y$ and $X>x$, extracting image data in a first row to a $Y^{th}$ row as the image data at the first resolution from image data at a resolution of $X*(Y+y)$ of the received to-be-displayed image, and extracting image data in previous x columns of image data in a $(Y+1)^{th}$ row to a $(Y+y)^{th}$ row as the image data at the second resolution; or extracting the image data in the first row to the $Y^{th}$ row as the image data at the first resolution from the image data at the resolution of $X*(Y+y)$ of the received to-be-displayed image, and extracting image data in last x columns of the image data in the $(Y+1)^{th}$ row to the $(Y+y)^{th}$ row as the image data at the second resolution.

In the case that the high-definition image data corresponding to the fixation region is combined with the low-definition image data corresponding to the non-fixation region, the high-definition image data corresponding to the fixation region has a resolution different from the low-definition image data corresponding to the non-fixation region. In order to provide an identical scaling ratio in both an X-axis direction and a Y-axis direction in the case of displaying the image, in the combined image data at the resolution of $X*(Y+y)$, the image data in the first row to the $Y^{th}$ row may be the image data at the first resolution, the image data in previous x columns of the image data in the $(Y+1)^{th}$ row to the $(Y+y)^{th}$ row may be the image data at the second resolution, and the image data in the $(x+1)^{th}$ column to the $X^{th}$ column of the image data in the $(Y+1)^{th}$ row to the $(Y+y)^{th}$ row may be invalid image data; or the image data in the first row to the $Y^{th}$ row may be the image data at the first resolution, the image data in last x columns of the image data in the $(Y+1)^{th}$ row to the $(Y+y)^{th}$ row may be the image data at the second resolution, and the image data in the first column to the $(X-x)^{th}$ column of the image data in the $(Y+1)^{th}$ row to the $(Y+y)^{th}$ row may be invalid image data. In this way, it is able to effectively reduce the difficulty in scaling up the image data in the case that the low-definition image data is scaled up at different scaling ratios in horizontal and longitudinal directions. Hence, in the case of receiving the image data from the image processing device, the display device may extract the image data in the first row to the $Y^{th}$ row as the image data at the first resolution from the image data at the resolution of $X*(Y+y)$ of the received to-be-displayed image, and extract the image data in previous x columns of the image data in the $(Y+1)^{th}$ row to the $(Y+y)^{th}$ row as the image data at the second resolution; or extract the image data in the first row to the $Y^{th}$ row as the image data at the first resolution from the image data at the resolution of $X*(Y+y)$ of the received to-be-displayed image, and extract the image data in last x columns of the image data in the $(Y+1)^{th}$ row to the $(Y+y)^{th}$ row as the image data at the second resolution.

The present disclosure will be described hereinafter in more details in conjunction with the embodiments.

In the embodiments of the present disclosure, the display device may determine at first the fixation region and the non-fixation region on the display screen of the display device, e.g., using an eyeball tracking technique, and then transmit the information about the fixation region and the non-fixation region to the image processing device.

Figure 3:
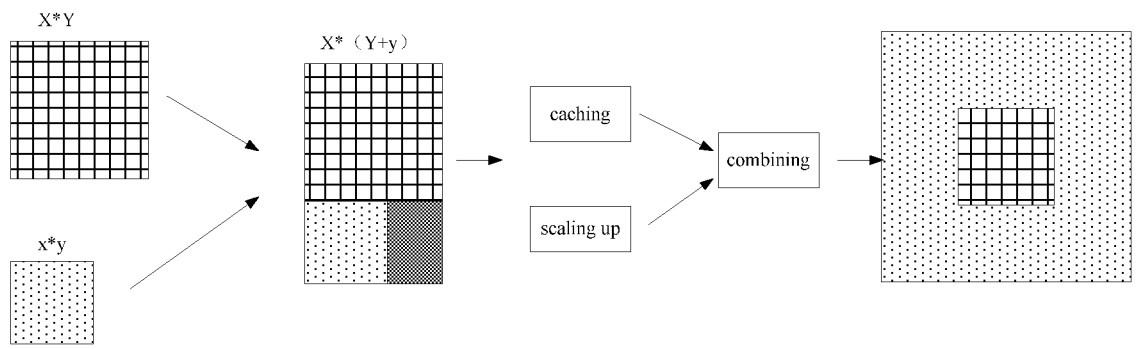
FIG. 3 is a schematic view showing a procedure of combining and stitching high-definition image data corresponding to a fixation region with low-definition image data corresponding to a non-fixation region according to one embodiment of the present disclosure.

As shown in FIG. 3, a Graphics Processing Unit (GPU) rendering technique may be adopted. The high-definition image data corresponding to the fixation region has a resolution of $X*Y$, and the low-definition image data corresponding to the non-fixation region has a resolution of $x*y$, where $X>x$. The low-definition image data is acquired through GPU compression on the original high-definition image data. In FIG. 3, the image processing device may combine the high-definition image data at the resolution of $X*Y$ and the low-definition image data at the resolution of $x*y$ into the image data at the resolution of $X*(Y+y)$, and output the combined image data. In the combined image data at the resolution of $X*(Y+y)$, the image data in the first row to the $Y^{th}$ row is the image data at the first resolution, the image data in previous x columns of the image data in the $(Y+1)^{th}$ row to the $(Y+y)^{th}$ row is the image data at the second resolution, and the image data in the $(x+1)^{th}$ column to the $X^{th}$ column of the image data in the $(Y+1)^{th}$ row to the $(Y+y)^{th}$ row is invalid image data. The image processing device may transmit the combined image data to the display device. Then, the driving IC of the display device may scale up the low-definition image data corresponding to the non-fixation region, combine it with the high-definition image data corresponding to the fixation region, and then output and display the combined image data.

Figure 4:
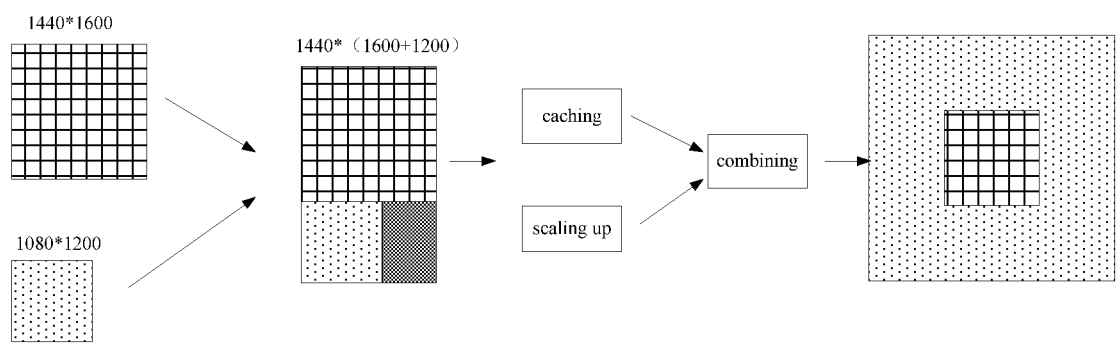
FIG. 4 is another schematic view showing the procedure of combining and stitching the high-definition image data corresponding to the fixation region with the low-definition image data corresponding to the non-fixation region according to one embodiment of the present disclosure.

The resolution of the low-definition image data corresponding to the non-fixation region is associated with a size and a resolution of the display screen. In the case that the display screen has a size of 3.5 inches and a resolution of 4320*4800, the high-definition image data corresponding to the fixation region may have a resolution of 1400*1600, so as to provide an optimum visual effect. As shown in FIG. 4, the high-definition image data corresponding to the fixation region has a resolution of 1440*1600, and the low-definition image data corresponding to the non-fixation region has a resolution of 1080*1200. In order to ensure an identical scaling ratio in both the X-axis and Y-axis directions, in the case of combining the high-definition image data with the low-definition image data, invalid image data at a resolution of 360*1200 may be compensated on the right of the low-definition image data. After the combined image data has been transmitted to the display device, the driving IC of the display device may discard the invalid image data, scale up the image data at the resolution of 1080*1200 so as to acquire the image data at the resolution of 4320*4800, stitch it with the image data at the resolution of 1440*1600 while outputting the image data at the resolution of 4320*4800, and then output and display the stitched image data.

Figure 5:
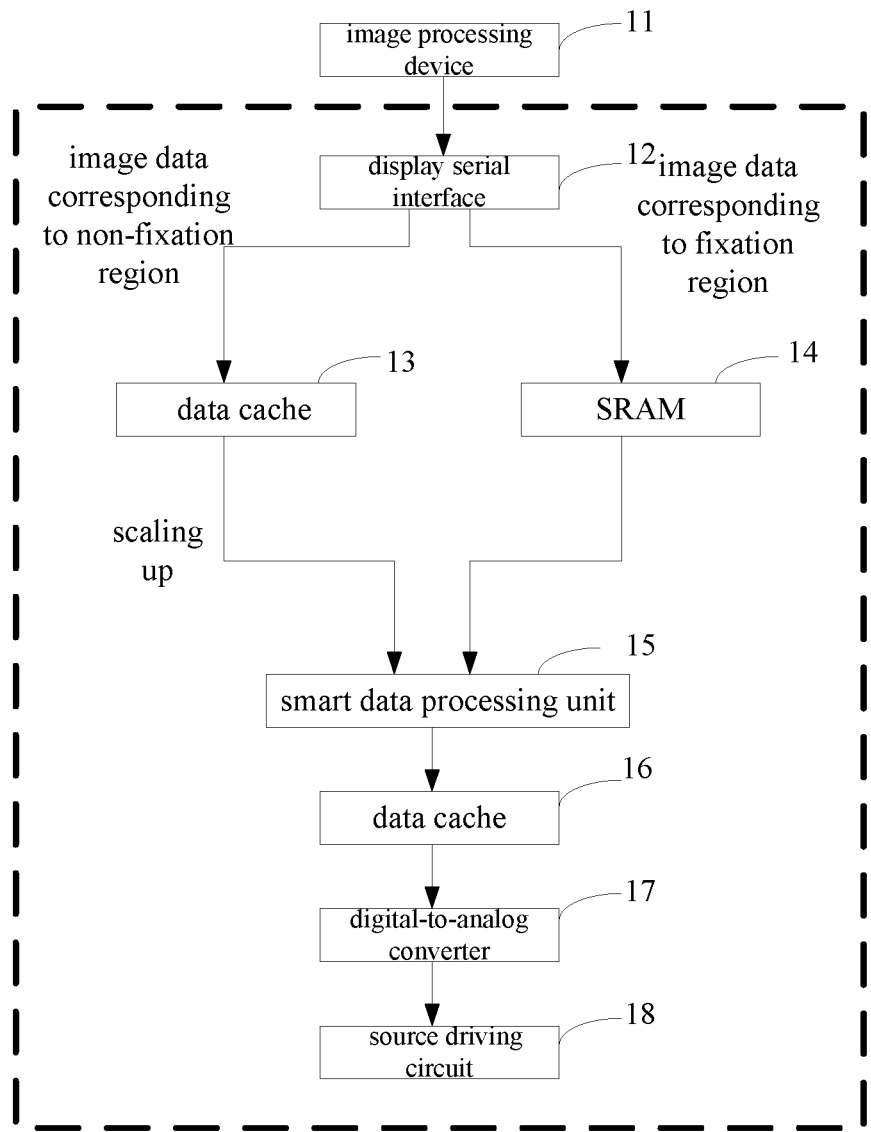
FIG. 5 is a schematic view showing an internal data processing procedure of a display device according to one embodiment of the present disclosure.

As shown in FIG. 5, the display device may at first receive the image data from the image processing device 11 via a display serial interface 12. The image data includes the image data corresponding to the fixation region and the image data corresponding to the non-fixation region. Next, the display device may store the image data corresponding to the non-fixation region into a data cache 13, and store the image data corresponding to the fixation region into a Static Random Access Memory (SRAM) 14. The image data corresponding to the non-fixation region in the data cache 13 may be scaled up, and transmitted together with the image data corresponding to the fixation region in the SRAM 14 to a smart data processing unit 15. The smart data processing unit 15 may perform such treatment as filtration and color enhancement on the image data. The image data from the smart data processing unit 15 may be transmitted to a data cache 16, and converted by a digital-to-analog converter 17. The converted image data may then be transmitted to a source driving circuit 18 of the display device. After operational amplification and grayscale voltage conversion, the source driving circuit 18 may output an electric signal, so as to display the image.

According to the embodiments of the present disclosure, it is able to compress and output the image data corresponding to the non-fixation region while ensuring the display of the original high-definition image data corresponding to the fixation region, thereby to reduce the data transmission bandwidth and reduce the power consumption.

Figure 6:
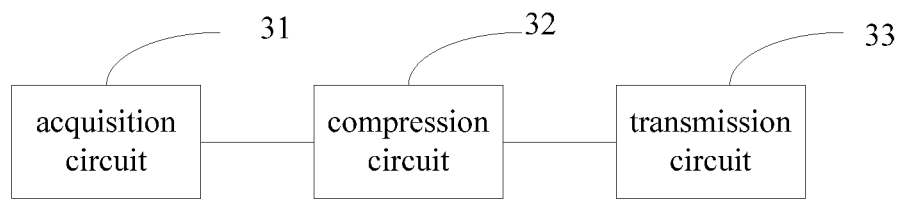
FIG. 6 is a block diagram of an image processing device according to one embodiment of the present disclosure.

The present disclosure further provides in some embodiments an image data transmission device for use in an image processing device capable of being in communication with a display device. As shown in FIG. 6, the image data transmission device includes: an acquisition circuit 31 configured to acquire a fixation region and a non-fixation region on a display screen of the display device; a compression circuit 32 configured to compress image data of a to-be-displayed image corresponding to the non-fixation region to acquire image data at a second resolution; and a transmission circuit 33 configured to combine the image data at the second resolution with image data of the to-be-displayed image at a first resolution corresponding to the fixation region, and output the combined image data to the display device, the first resolution being substantially greater than the second resolution.

According to the image data transmission device in the embodiments of the present disclosure, the fixation region and the non-fixation region on the display screen of the display device are acquired at first, then the image data of the to-be-displayed image corresponding to the non-fixation region is compressed so as to acquire low-definition image data, and then high-definition image data corresponding to the fixation region and the low-definition image data corresponding to the non-fixation region are combined together and transmitted to the display device. As a result, it is able to compress and transmit the image data corresponding to the non-fixation region while ensure the transmission of the original, high-definition image data corresponding to the fixation region, thereby to effectively reduce the data volume transmitted between the image processing device and the display device, and reduce the power consumption.

In a possible embodiment of the present disclosure, the acquisition circuit 31 is further configured to receive information about the fixation region and the non-fixation region from the display device. To be specific, the display device may determine the fixation region and the non-fixation region on the display screen using an eyeball tracking technique, and transmit the information about the fixation region and the non-fixation region to the image processing device.

In a possible embodiment of the present disclosure, the transmission circuit 33 is further configured to, in the case that the second resolution is x*y, the first resolution is X*Y and X>x, combine the image data at the second resolution with the image data at the first resolution so as to acquire image data at a resolution of X*(Y+y). In the combined image data at the resolution of X*(Y+y), image data in a first row to a $Y^{th}$ row is the image data at the first resolution, image data in previous x columns of image data in a $(Y+1)^{th}$ row to a $(Y+y)^{th}$ row is the image data at the second resolution, and image data in an $(x+1)^{th}$ column to an $X^{th}$ column of the image data in the $(Y+1)^{th}$ row to the $(Y+y)^{th}$ row is invalid image data; or the image data in the first row to the $Y^{th}$ row is the image data at the first resolution, image data in last x columns of the image data in the $(Y+1)^{th}$ row to the $(Y+y)^{th}$ row is the image data at the second resolution, and image data in a first column to an $(X-x)^{th}$ column of the image data in the $(Y+1)^{th}$ row to the $(Y+y)^{th}$ row is invalid image data.

In the case that the high-definition image data corresponding to the fixation region is combined with the low-definition image data corresponding to the non-fixation region, the high-definition image data corresponding to the fixation region has a resolution different from the low-definition image data corresponding to the non-fixation region. In order to provide an identical scaling ratio in both an X-axis direction and a Y-axis direction in the case of displaying the image, in the combined image data at the resolution of X*(Y+y), the image data in the first row to the $Y^{th}$ row may be the image data at the first resolution, the image data in previous x columns of the image data in the $(Y+1)^{th}$ row to the $(Y+y)^{th}$ row may be the image data at the second resolution, and the image data in the $(x+1)^{th}$ column to the $X^{th}$ column of the image data in the $(Y+1)^{th}$ row to the $(Y+y)^{th}$ row may be invalid image data; or the image data in the first row to the $Y^{th}$ row may be the image data at the first resolution, the image data in last x columns of the image data in the $(Y+1)^{th}$ row to the $(Y+y)^{th}$ row may be the image data at the second resolution, and the image data in the first column to the $(X-x)^{th}$ column of the image data in the $(Y+1)^{th}$ row to the $(Y+y)^{th}$ row may be invalid image data. In this way, it is able to effectively reduce the difficulty in scaling up the image data in the case that the low-definition image data is scaled up at different scaling ratios in horizontal and longitudinal directions.

Figure 7:
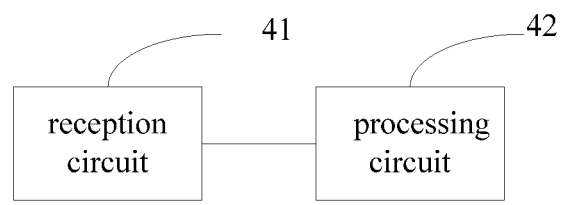
FIG. 7 is a block diagram of a display device according to one embodiment of the present disclosure.

The present disclosure further provides in some embodiments an image data processing device for use in a display device capable of being in communication with an image processing device. As shown in FIG. 7, the image data processing device includes: a reception circuit 41 configured to receive image data of a to-be-displayed image from the image processing device, and acquire image data at a first resolution corresponding to a fixation region and image data at a second resolution corresponding to a non-fixation region in accordance with the image data of the to-be-displayed image, the first resolution being substantially greater than the second resolution; and a processing circuit 42 configured to scale up the image data at the second resolution, stitch the resultant image data at the second resolution with the image data at the first resolution, and output and display the stitched image data.

According to the image data processing device in the embodiments of the present disclosure, the image data received by the display device includes the low-definition image data corresponding to the non-fixation region and the high-definition image data corresponding to the fixation region. The low-definition image data is acquired through compressing the image data of the to-be-displayed image corresponding to the non-fixation region. As a result, it is able to compress and transmit the image data corresponding to the non-fixation region while ensuring the transmission of the original, high-definition image data corresponding to the fixation region, thereby to effectively reduce the data volume transmitted between the image processing device and the display device, and reduce the power consumption.

In a possible embodiment of the present disclosure, the image data processing device further includes: a user tracking circuit configured to determine the fixation region and the non-fixation region on a display screen of the display device; and a transmission circuit configured to transmit information about the fixation region and the non-fixation region to the image processing device.

In a possible embodiment of the present disclosure, the reception circuit 41 is further configured to: in the case that the second resolution is x*y, the first resolution is X*Y and X>x, extract image data in a first row to a $Y^{th}$ row as the image data at the first resolution from image data at a resolution of X*(Y+y) of the received to-be-displayed image, and extract image data in previous x columns of image data in a $(Y+1)^{th}$ row to a $(Y+y)^{th}$ row as the image data at the second resolution; or extract the image data in the first row to the $Y^{th}$ row as the image data at the first resolution from the image data at a resolution of X*(Y+y) of the received to-be-displayed image, and extract image data in last x columns of the image data in the $(Y+1)^{th}$ row to the $(Y+y)^{th}$ row as the image data at the second resolution.

In the case that the high-definition image data corresponding to the fixation region is combined with the low-definition image data corresponding to the non-fixation region, the high-definition image data corresponding to the fixation region has a resolution different from the low-definition image data corresponding to the non-fixation region. In order to provide an identical scaling ratio in both an X-axis direction and a Y-axis direction in the case of displaying the image, in the combined image data at the resolution of X*(Y+y), the image data in the first row to the $Y^{th}$ row may be the image data at the first resolution, the image data in previous x columns of the image data in the $(Y+1)^{th}$ row to the $(Y+y)^{th}$ row may be the image data at the second resolution, and the image data in the $(x+1)^{th}$ column to the $X^{th}$ column of the image data in the $(Y+1)^{th}$ row to the $(Y+y)^{th}$ row may be invalid image data; or the image data in the first row to the $Y^{th}$ row may be the image data at the first resolution, the image data in last x columns of the image data in the $(Y+1)^{th}$ row to the $(Y+y)^{th}$ row may be the image data at the second resolution, and the image data in the first column to the $(X-x)^{th}$ column of the image data in the $(Y+1)^{th}$ row to the $(Y+y)^{th}$ row may be invalid image data. In this way, it is able to effectively reduce the difficulty in scaling up the image data in the case that the low-definition image data is scaled up at different scaling ratios in horizontal and longitudinal directions. Hence, in the case of receiving the image data from the image processing device, the display device may extract the image data in the first row to the $Y^{th}$ row as the image data at the first resolution from the image data at the resolution of X*(Y+y) of the received to-be-displayed image, and extract the image data in previous x columns of the image data in the $(Y+1)^{th}$ row to the $(Y+y)^{th}$ row as the image data at the second resolution; or extract the image data in the first row to the $Y^{th}$ row as the image data at the first resolution from the image data at the resolution of X*(Y+y) of the received to-be-displayed image, and extract the image data in last x columns of the image data in the $(Y+1)^{th}$ row to the $(Y+y)^{th}$ row as the image data at the second resolution.

The present disclosure further provides in some embodiments an image processing device including a memory, a processor and a computer program stored in the memory and capable of being executed by the processor. The processor is configured to execute the computer program so as to: acquire a fixation region and a non-fixation region on a display screen of a display device; compress image data of a to-be-displayed image corresponding to the non-fixation region to acquire image data at a second resolution; and combine the image data at the second resolution with image data of the to-be-displayed image at a first resolution corresponding to the fixation region, and output the combined image data to the display device, the first resolution being substantially greater than the second resolution.

In a possible embodiment of the present disclosure, the processor is further configured to execute the computer program, so as to receive information about the fixation region and the non-fixation region from the display device.

In a possible embodiment of the present disclosure, the processor is further configured to execute the computer program, so as to, in the case that the second resolution is x*y, the first resolution is X*Y and X>x, combine the image data at the second resolution with the image data at the first resolution so as to acquire image data at a resolution of X*(Y+y). In the combined image data at the resolution of X*(Y+y), image data in a first row to a $Y^{th}$ row is the image data at the first resolution, image data in previous x columns of image data in a $(Y+1)^{th}$ row to a $(Y+y)^{th}$ row is the image data at the second resolution, and image data in an $(x+1)^{th}$ column to an $X^{th}$ column of the image data in the $(Y+1)^{th}$ row to the $(Y+y)^{th}$ row is invalid image data; or the image data in the first row to the $Y^{th}$ row is the image data at the first resolution, image data in last x columns of the image data in the $(Y+1)^{th}$ row to the $(Y+y)^{th}$ row is the image data at the second resolution, and image data in a first column to an $(X-x)^{th}$ column of the image data in the $(Y+1)^{th}$ row to the $(Y+y)^{th}$ row is invalid image data.

The present disclosure further provides in some embodiments a display device including a memory, a processor and a computer program stored in the memory and capable of being executed by the processor. The processor is configured to execute the computer program, so as to: receive image data of a to-be-displayed image from the image processing device, and acquire image data at a first resolution corresponding to a fixation region and image data at a second resolution corresponding to a non-fixation region in accordance with the image data of the to-be-displayed image, the first resolution being substantially greater than the second resolution; and scale up the image data at the second resolution, stitch the resultant image data at the second resolution with the image data at the first resolution, and output and display the stitched image data.

In a possible embodiment of the present disclosure, the processor is further configured to execute the computer program, so as to: determine the fixation region and the non-fixation region on a display screen of the display device; and a transmission circuit configured to transmit information about the fixation region and the non-fixation region to the image processing device.

In a possible embodiment of the present disclosure, the processor is further configured to execute the computer program, so as to: in the case that the second resolution is x*y, the first resolution is X*Y and X>x, extract image data in a first row to a $Y^{th}$ row as the image data at the first resolution from image data at a resolution of $X*(Y+y)$ of the received to-be-displayed image, and extract image data in previous x columns of image data in a $(Y+1)^{th}$ row to a $(Y+y)^{th}$ row as the image data at the second resolution; or extract the image data in the first row to the $Y^{th}$ row as the image data at the first resolution from the image data at a resolution of $X*(Y+y)$ of the received to-be-displayed image, and extract image data in last x columns of the image data in the $(Y+1)^{th}$ row to the $(Y+y)^{th}$ row as the image data at the second resolution.

The present disclosure further provides in some embodiments a computer-readable storage medium storing therein a computer program. The computer program is executed by a processor, so as to: acquire a fixation region and a non-fixation region on a display screen of a display device; compress image data of a to-be-displayed image corresponding to the non-fixation region to acquire image data at a second resolution; and combine the image data at the second resolution with image data of the to-be-displayed image at a first resolution corresponding to the fixation region, and output the combined image data to the display device, the first resolution being substantially greater than the second resolution.

In a possible embodiment of the present disclosure, the computer program is executed by the processor, so as to receive information about the fixation region and the non-fixation region from the display device.

In a possible embodiment of the present disclosure, the computer program is executed by the processor, so as to, in the case that the second resolution is x*y, the first resolution is X*Y and X>x, combine the image data at the second resolution with the image data at the first resolution so as to acquire image data at a resolution of $X*(Y+y)$. In the combined image data at the resolution of $X*(Y+y)$, image data in a first row to a $Y^{th}$ row is the image data at the first resolution, image data in previous x columns of image data in a $(Y+1)^{th}$ row to a $(Y+y)^{th}$ row is the image data at the second resolution, and image data in an $(x+1)^{th}$ column to an $X^{th}$ column of the image data in the $(Y+1)^{th}$ row to the $(Y+y)^{th}$ row is invalid image data; or the image data in the first row to the $Y^{th}$ row is the image data at the first resolution, image data in last x columns of the image data in the $(Y+1)^{th}$ row to the $(Y+y)^{th}$ row is the image data at the second resolution, and image data in a first column to an $(X-x)^{th}$ column of the image data in the $(Y+1)^{th}$ row to the $(Y+y)^{th}$ row is invalid image data.

The present disclosure further provides in some embodiments a computer-readable storage medium storing therein a computer program. The computer program is executed by a processor, so as to: receive image data of a to-be-displayed image from the image processing device, and acquire image data at a first resolution corresponding to a fixation region and image data at a second resolution corresponding to a non-fixation region in accordance with the image data of the to-be-displayed image, the first resolution being substantially greater than the second resolution; and scale up the image data at the second resolution, stitch the resultant image data at the second resolution with the image data at the first resolution, and output and display the stitched image data.

In a possible embodiment of the present disclosure, the computer program is executed by the processor, so as to: determine the fixation region and the non-fixation region on a display screen of the display device; and a transmission circuit configured to transmit information about the fixation region and the non-fixation region to the image processing device.

In a possible embodiment of the present disclosure, the computer program is executed by the processor, so as to in the case that the second resolution is x*y, the first resolution is X*Y and X>x, extract image data in a first row to a $Y^{th}$ row as the image data at the first resolution from image data at a resolution of $X*(Y+y)$ of the received to-be-displayed image, and extract image data in previous x columns of image data in a $(Y+1)^{th}$ row to a $(Y+y)^{th}$ row as the image data at the second resolution; or extract the image data in the first row to the $Y^{th}$ row as the image data at the first resolution from the image data at a resolution of $X*(Y+y)$ of the received to-be-displayed image, and extract image data in last x columns of the image data in the $(Y+1)^{th}$ row to the $(Y+y)^{th}$ row as the image data at the second resolution.

The computer-readable storage medium may include permanent or impermanent, mobile or immobile storage medium capable of storing therein information using any method or technique. The information may be a computer-readable instruction, a data structure, a program or any other data. The computer-readable storage medium may include, but not limited to, a Random Access Memory (e.g., Phase Change Random Access Memory (PRAM), SRAM or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An image data transmission method for an image processing device capable of being in communication with a display device, comprises:
   acquiring a fixation region and a non-fixation region on a display screen of the display device;
   compressing image data of a to-be-displayed image corresponding to the non-fixation region to acquire image data at a second resolution; and
   combining the image data at the second resolution with image data of the to-be-displayed image at a first resolution corresponding to the fixation region, and outputting the combined image data to the display device, the first resolution being greater than the second resolution,
   wherein the step of combining the image data at the second resolution with the image data of the to-be-displayed image at the first resolution corresponding to the fixation region and outputting the combined image data to the display device comprises, in the case that the second resolution is x*y, the first resolution is X*Y and X>x, combining the image data at the second resolution with the image data at the first resolution so as to acquire image data at a resolution of X*(Y+y);
   wherein in the combined image data at the resolution of X*(Y+y), image data in a first row to a $Y^{th}$ row is the image data at the first resolution, image data in previous x columns of image data in a $(Y+1)^{th}$ row to a $(Y+y)^{th}$ row is the image data at the second resolution, and image data in an $(x+1)^{th}$ column to an $X^{th}$ column of the image data in the $(Y+1)^{th}$ row to the $(Y+y)^{th}$ row is invalid image data; or the image data in the first row to the $Y^{th}$ row is the image data at the first resolution, image data in last x columns of the image data in the $(Y+1)^{th}$ row to the $(Y+y)^{th}$ row is the image data at the second resolution, and image data in a first column to an $(X-x)^{th}$ column of the image data in the $(Y+1)^{th}$ row to the $(Y+y)^{th}$ row is invalid image data.

2. The image data transmission method according to claim 1, wherein the step of acquiring the fixation region and the non-fixation region on the display screen of the display device comprises receiving information about the fixation region and the non-fixation region from the display device.

3. The image data transmission method according to claim 1, wherein high-definition image data corresponding to the fixation region has the first resolution of 1440*1600, and low-definition image data corresponding to the non-fixation region has the second resolution of 1080*1200.

4. The image data transmission method according to claim 3, wherein in the case of combining the high-definition image data with the low-definition image data, invalid image data having a resolution of 360*1200 is compensated on the right of the low-definition image data.

5. An image processing device, comprising a memory, a processor and a computer program stored in the memory and capable of being executed by the processor, wherein the processor is configured to execute the computer program so as to implement the image data transmission method according to claim 1.

6. A non-transistory computer-readable storage medium storing therein a computer program, wherein the computer program is executed by a processor, so as to implement steps of the image data transmission method according to claim 1.

7. An image data processing method for use in a display device capable of being in communication with an image processing device, comprising:
   receiving image data of a to-be-displayed image from the image processing device, and acquiring image data at a first resolution corresponding to a fixation region and image data at a second resolution corresponding to a non-fixation region in accordance with the image data of the to-be-displayed image, the first resolution being greater than the second resolution; and
   scaling up the image data at the second resolution, stitching the resultant image data at the second resolution with the image data at the first resolution, and outputting and displaying the stitched image data,
   wherein the step of acquiring the image data at the first resolution corresponding to the fixation region and the image data at the second resolution corresponding to the non-fixation region in accordance with the image data of the to-be-displayed image comprises:
   in the case that the second resolution is x*y, the first resolution is X*Y and X>x, extracting image data in a first row to a $Y^{th}$ row as the image data at the first resolution from image data at a resolution of X*(Y+y) of the received to-be-displayed image, and extracting image data in previous x columns of image data in a $(Y+1)^{th}$ row to a $(Y+y)^{th}$ row as the image data at the second resolution; or
   extracting the image data in the first row to the $Y^{th}$ row as the image data at the first resolution from the image data at the resolution of X*(Y+y) of the received to-be-displayed image, and extracting image data in last x columns of the image data in the $(Y+1)^{th}$ row to the $(Y+y)^{th}$ row as the image data at the second resolution.

8. The image data processing method according to claim 7, wherein prior to the step of receiving the image data of the to-be-displayed image from the image processing device, the image data processing method further comprises:
   determining the fixation region and the non-fixation region on a display screen of the display device; and
   transmitting information about the fixation region and the non-fixation region to the image processing device.

9. The image data processing method according to claim 7, wherein high-definition image data corresponding to the fixation region has the first resolution of 1440*1600, and low-definition image data corresponding to the non-fixation region has the second resolution of 1080*1200.

10. The image data processing method according to claim 9, wherein after the combined image data has been transmitted to the display device, the image data processing method further comprises discarding, by a driving Integrated Circuit (IC) of the display device, invalid image data, scaling up the image data at the second resolution, stitching the resultant image data at the second resolution with the image data at the first resolution while outputting the resultant image data at the second resolution, and outputting and displaying the stitched image data.

11. A display device, comprising a memory, a processor and a computer program stored in the memory and capable of being executed by the processor, the processor is configured to execute the computer program so as to implement the image data processing method according to claim 7.

12. A non-transistory computer-readable storage medium storing therein a computer program, wherein the computer program is executed by a processor, so as to implement steps of the image data processing method according to claim 7.

13. An image data transmission device for use in an image processing device capable of being in communication with a display device, comprising:
- an acquisition circuit configured to acquire a fixation region and a non-fixation region on a display screen of the display device;
- a compression circuit configured to compress image data of a to-be-displayed image corresponding to the non-fixation region to acquire image data at a second resolution; and
- a transmission circuit configured to combine the image data at the second resolution with image data of the to-be-displayed image at a first resolution corresponding to the fixation region, and output the combined image data to the display device, the first resolution being greater than the second resolution,
- wherein the transmission circuit is further configured to, in the case that the second resolution is $x*y$, the first resolution is $X*Y$ and $X>x$, combine the image data at the second resolution with the image data at the first resolution so as to acquire image data at a resolution of $X*(Y+y)$,
- wherein in the combined image data at the resolution of $X*(Y+y)$, image data in a first row to a $Y^{th}$ row is the image data at the first resolution, image data in previous x columns of image data in a $(Y+1)^{th}$ row to a $(Y+y)^{th}$ row is the image data at the second resolution, and image data in an $(x+1)^{th}$ column to an $X^{th}$ column of the image data in the $(Y+1)^{th}$ row to the $(Y+y)^{th}$ row is invalid image data; or the image data in the first row to the $Y^{th}$ row is the image data at the first resolution, image data in last x columns of the image data in the $(Y+1)^{th}$ row to the $(Y+y)^{th}$ row is the image data at the second resolution, and image data in a first column to an $(X-x)^{th}$ column of the image data in the $(Y+1)^{th}$ row to the $(Y+y)^{th}$ row is invalid image data.

14. The image data transmission device according to claim 13, wherein the acquisition circuit is further configured to receive information about the fixation region and the non-fixation region from the display device.

15. An image data processing device for use in a display device capable of being in communication with an image processing device, comprising:
- a reception circuit configured to receive image data of a to-be-displayed image from the image processing device, and acquire image data at a first resolution corresponding to a fixation region and image data at a second resolution corresponding to a non-fixation region in accordance with the image data of the to-be-displayed image, the first resolution being greater than the second resolution; and
- a processing circuit configured to scale up the image data at the second resolution, stitch the resultant image data at the second resolution with the image data at the first resolution, and output and display the stitched image data,
- wherein the reception circuit is further configured to:
- in the case that the second resolution is $x*y$, the first resolution is $X*Y$ and $X>x$, extract image data in a first row to a $Y^{th}$ row as the image data at the first resolution from image data at a resolution of $X*(Y+y)$ of the received to-be-displayed image, and extract image data in previous x columns of image data in a $(Y+1)^{th}$ row to a $(Y+y)^{th}$ row as the image data at the second resolution; or
- extract the image data in the first row to the $Y^{th}$ row as the image data at the first resolution from the image data at the resolution of $X*(Y+y)$ of the received to-be-displayed image, and extract image data in last x columns of the image data in the $(Y+1)^{th}$ row to the $(Y+y)^{th}$ row as the image data at the second resolution.

16. The image data processing device according to claim 15, further comprising:
- a user tracking circuit configured to determine the fixation region and the non-fixation region on a display screen of the display device; and
- a transmission circuit configured to transmit information about the fixation region and the non-fixation region to the image processing device.

* * * * *